US009479810B2

(12) United States Patent
Gordhan

(10) Patent No.: US 9,479,810 B2
(45) Date of Patent: Oct. 25, 2016

(54) BROADCAST SCHEDULE SYNCHRONIZED DIGITAL VIDEO RECORDER

(71) Applicant: Accenture Global Services Limited, Dublin (IE)

(72) Inventor: Sagar Gordhan, West Midlands (GB)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/605,852

(22) Filed: Jan. 26, 2015

(65) Prior Publication Data

US 2016/0219323 A1 Jul. 28, 2016

(51) Int. Cl.

| H04N 21/254 | (2011.01) |
|---|---|
| H04N 21/262 | (2011.01) |
| H04N 21/234 | (2011.01) |
| H04N 21/235 | (2011.01) |
| H04N 21/2747 | (2011.01) |
| H04N 21/43 | (2011.01) |
| H04N 21/433 | (2011.01) |
| H04N 21/435 | (2011.01) |
| H04N 21/44 | (2011.01) |
| H04N 21/462 | (2011.01) |
| H04N 21/482 | (2011.01) |

(52) U.S. Cl.
CPC .... *H04N 21/26283* (2013.01); *H04N 21/2353* (2013.01); *H04N 21/23418* (2013.01); *H04N 21/254* (2013.01); *H04N 21/2747* (2013.01); *H04N 21/435* (2013.01); *H04N 21/4307* (2013.01); *H04N 21/4334* (2013.01); *H04N 21/44008* (2013.01); *H04N 21/462* (2013.01); *H04N 21/482* (2013.01)

(58) Field of Classification Search
None
See application file for complete search history.

(56) References Cited

U.S. PATENT DOCUMENTS

| 8,102,474 B2 | 1/2012 | Huang et al. |
|---|---|---|
| 2008/0107392 A1* | 5/2008 | Grannan ............... H04N 5/445 386/291 |
| 2008/0250447 A1* | 10/2008 | Rowe .................... G06Q 30/02 725/32 |
| 2010/0008644 A1 | 1/2010 | Kim |
| 2011/0032372 A1* | 2/2011 | Uemura ............. G06K 9/00228 348/220.1 |
| 2014/0047467 A1* | 2/2014 | Arling .............. H04N 21/42204 725/14 |

FOREIGN PATENT DOCUMENTS

| WO | WO 2009/087496 A2 | 7/2009 |
|---|---|---|
| WO | 2011/146178 A1 | 11/2011 |

OTHER PUBLICATIONS

Wu et al., "The Design of a NPVR System for an IPTV Platform", International Journal of Electronics and Electrical Engineering vol. 1, No. 3, Sep. 2013, Engineering and Technology Publishing, pp. 140-144.
Anonymous: "Digital Video Broadcasting (DVB); Carriage and signalling of TV-Anytime information in DVB transport streams Technical Specification", European Telecommunications Standards Institute, Jan. 1, 2012; 121 pages. Retrieved from the Internet: URL:http://www.etsi.org/deliver/etsi_ts/102300_102399/102323/01.05.01_60/ts_102323v010501p.pdf [Retrieved on Apr. 26, 2016].
The Extended European search report, European Patent Application No. 15200996.5, European Patent Office, dated May 4, 2016, 11 pages.

* cited by examiner

*Primary Examiner* — Eileen Adams
(74) *Attorney, Agent, or Firm* — Mannava & Kang, P.C.

(57) ABSTRACT

A disclosed example may accurately start and stop a recording of an event based on accurate event scheduling information from a channel broadcaster. A start time and stop time for a recording of the event may be scheduled according to EPG data. In response to determining that the channel is a controlled channel, which includes accurate event scheduling information provided by a channel broadcaster, a recording may be initially scheduled for the event according to the EPG data with an extended duration of a predetermined time value. The digitally encoded transport stream may be continuously monitored to detect a new event and the detected new event may then be mapped to the event. As a result, the recording time of the event may be accurately updated by extracting a set of parameters from the accurate event schedule information of the new event.

17 Claims, 6 Drawing Sheets

500

```
PID:  18 (0x0012)
   EIT-decoding....
   Table_ID: 79 (0x4f)  [= Event Information Table (EIT) - other transport stream,
present/following]
   section_syntax_indicator: 1 (0x01)
   reserved_1: 1 (0x01)
   reserved_2: 3 (0x03)
   Section_length: 351 (0x015f)
   Service_ID: 28110 (0x6dce)  [=  --> refers to PMT program_number]
   reserved_3: 3 (0x03)
   Version_number: 24 (0x18)
   current_next_indicator: 1 (0x01)  [= valid now]
   Section_number: 0 (0x00)
   Last_Section_number: 1 (0x01)
   Transport_stream_ID: 1101 (0x044d)
   Original_network_ID: 1 (0x0001)
   Segment_last_Section_number: 1 (0x01)
   Last_table_id: 79 (0x4f)  [= Event Information Table (EIT) - other transport
stream, present/following]

Event_ID: 64701 (0xfcbd)
      Start_time: 0xcf76100000 (=2004-04-15 10:00:00 [UTC])
      Duration: 0x0003000 (= 00:30:00 [UTC])
      Running_status: 4 (0x04)  [= running]
      Free_CA_mode: 0 (0x00)  [= unscrambled]
      Descriptors_loop_length: 324 (0x144)

DVB-DescriptorTag: 77 (0x4d)  [= short_event_descriptor]
         Descriptor_length: 30 (0x1e)
         ISO639_2_language_code:  deu
         Event_name_length: 8 (0x08)
         Event_name: "Event A"  -- Charset: Latin alphabet no. 5
         Text_length: 18 (0x12)
         Text: "DescriptionEventA"  -- Charset: Latin alphabet no. 5
```

FIG. 5

BROADCAST SCHEDULE SYNCHRONIZED DIGITAL VIDEO RECORDER

BACKGROUND

A Digital Video Recorder (DVR) (also known as a Personal Video Recorder (PVR)) is an electronic device that records video in a digital format to store in a local storage medium, such as a hard disk drive. As such, the DVR provides time-shifted viewing of broadcast television programs or events for end-users. For example, end-users may record a television program in real-time and then watch the recorded television program later at their own convenience. Typically, the DVR device utilizes Electronic Program Guide (EPG) data to schedule the start and stop recording times for television programs on each available broadcast channel. The EPG data may be provided by a third party EPG provider, which obtains the scheduling data (e.g., dates, times, titles, scheduled run times, etc.) from broadcasters, normalizes the data, and provides it in a packaged format to video service delivery providers (e.g., cable, satellite, Internet service providers).

The DVR may also be a network DVR (nDVR) (also known as a network PVR (nPVR)) that may store recordings at a location other than an end-user's private home. For instance, an end-user's recorded television program may be stored at a remote server, such as at a video service delivery provider's central server, instead of at an end-user's local DVR device. Essentially, an nDVR may implement a traditional DVR with network based storage.

BRIEF DESCRIPTION OF THE DRAWINGS

Features of the present disclosure are illustrated by way of example and not limited in the following figure(s), in which like numerals indicate like elements, in which:

FIG. 5 shows an Event Information Table (EIT), according to an example of the present disclosure.

DETAILED DESCRIPTION

Figure 1:
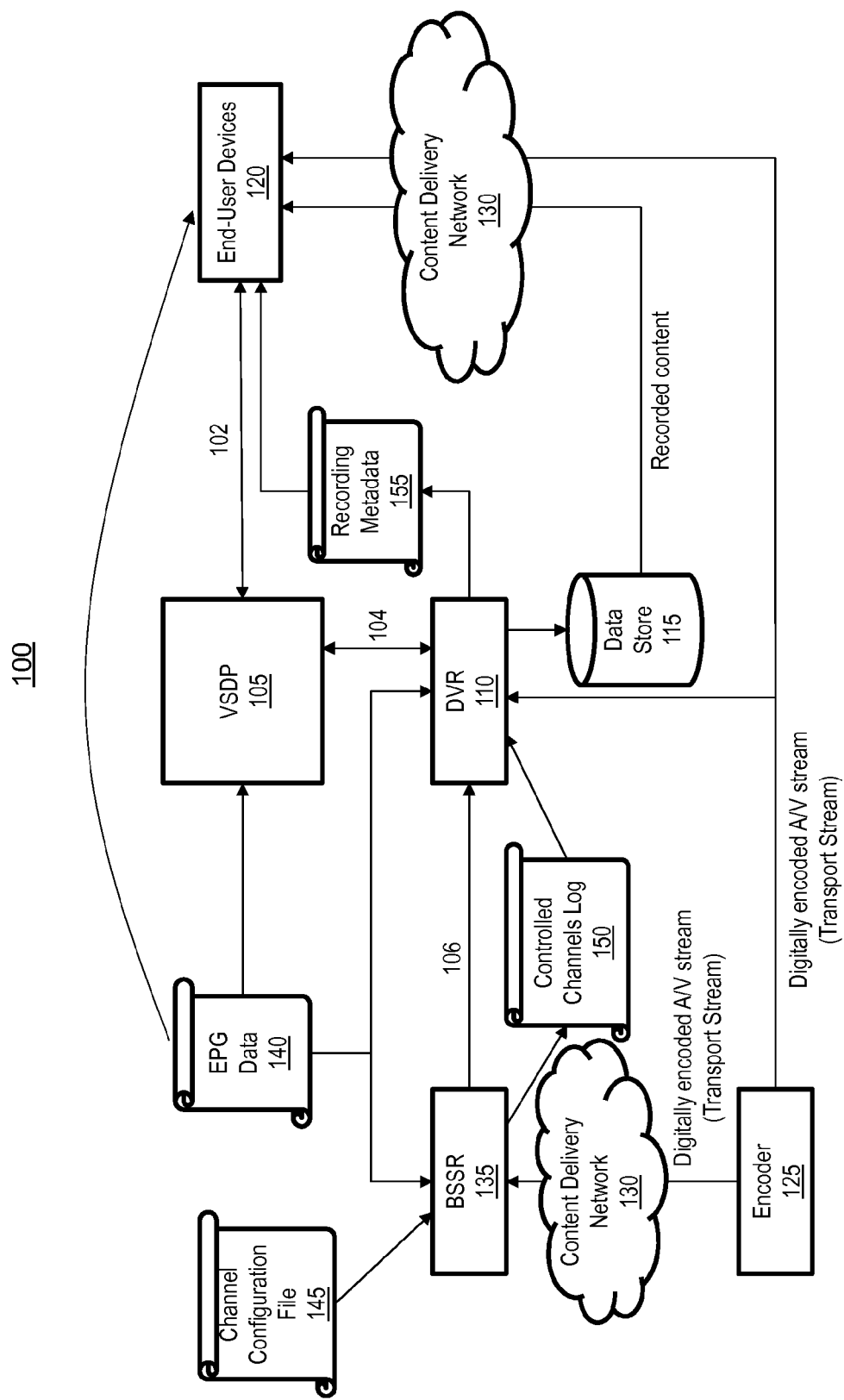
FIG. 1 shows a system diagram of a digital video recording system 100, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Typically, Digital Video Recorders (DVRs) and network DVRs (nDVRs) enable recordings of broadcast television programs or events based on Electronic Program Guide (EPG) data. The EPG data includes broadcast programming or scheduling information for current and upcoming events and may be provided to nDVRs for example by a third-party EPG provider. The third-party EPG provider may obtain the scheduling data. The EPG data, however, is not obtained in real-time by the third-party EPG provider, and thus may be inaccurate to the actual on-air event schedule. For example, a live sporting event or a news flash may extend an event beyond its originally scheduled time according to the EPG data. This inaccuracy may result in the recording of portions of other adjacent events or in an incomplete recording that was started too late or finished too early based on the inaccurate EPG data.

Disclosed herein are examples of a video recording server for accurately starting and stopping a recording of an event based on accurate event scheduling information from a channel broadcaster. The accurate event scheduling information for example is metadata about a television channel that is transmitted in-band with a digitally encoded transport stream by the channel broadcaster. For example, Service Information (SI) may be transmitted with MPEG-2 transport streams according to Digital Video Broadcasting (DVB) standards for digital televisions. The SI, for instance, may provide information regarding the delivery system, content, scheduling, timing, and etc. of broadcast data streams. The SI may include an Event Information Table (EIT) that provides information regarding currently playing events and upcoming events on a television channel in the form of present/following (p/f) information.

The disclosed video recording server may monitor the digitally encoded transport stream from the channel broadcaster to detect changes in the EIT that indicate a transition between p/f events. The transition between p/f events, for example, signals a start of a new event and an end of an old event. As such, the accurate event scheduling information (e.g., metadata, EIT, etc.), which is inserted in-band to the digitally encoded transport stream by the channel broadcaster, may be used to accurately adjust the scheduled start and stop times for recordings of events in real-time. Furthermore, the disclosed video recording server may retrospectively adjust event markers for a recording after the event has finished, thus ensuring that the end-user receives nothing exceeding an accurate recording of the complete event.

According to an example of the present disclosure, the video recording server may receive a record request from an end-user for an event on a channel and set a recording start time and stop time for the event according to EPG data. The video recording server then determines whether the channel hosting the event is a controlled channel that is included in a controlled channels log. The controlled channels log, for example, includes a set of channels for which accurate event scheduling information may be extracted from a digitally encoded transport stream that is provided by the channel broadcaster. In response to determining that the channel is a controlled channel, the video recording server may schedule the recording for the event according to EPG data but with an extended duration of a predetermined time value. Furthermore, the video recording server may continuously "listen to" or monitor the digitally encoded transport stream of the controlled channel to detect a new event for the controlled channel. According to an example, the detected new event is mapped to the event using a heuristic. As a result, the recording time of the event may be accurately updated by extracting a set of parameters from the accurate event schedule information of the new event.

According to an example, the updating of the recording of the event may include extracting a start time from the set of parameters of the accurate event schedule information of the new event. If it is determined that the start time of the new event is different from the recording start time for the event according to the EPG data, then the start time of the recording may be updated. For example, in response to the extracted start time being prior to the start time set according to the EPG data, the recording of the event may be started. Alternatively, in response to the extracted start time being subsequent to the start time set according to the EPG data, a start bookmark may be set in recording metadata for the event if the recording of the event is in progress, and the start time of the recording of the event may be updated to a different value if the recording of the event is not in progress.

According to another example, the updating of the recording of the event may include extracting a stop time from the set of parameters of the accurate event schedule information of the new event. In response to the extracted stop time being prior to the stop time set according to the EPG data, the recording of the event may be stopped if the recording is in progress and the extracted stop time indicates that the event has already ended. Alternatively, in response to the extracted stop time being subsequent to the stop time set according to the EPG data, the stop time of the recording of the event may be updated if the recording of the event is in progress or is not yet started, and a stop bookmark may be set in recording metadata for the event if the recording of the event was completed prior to extracting the stop time.

According to a further example, the updating of the recording of the event may include extracting a duration from the set of parameters of the accurate event schedule information of the new event. The recording duration for the event may be modified based on the extracted duration. For instance, the modifying may include stopping the recording of the event if the extracted duration indicates that the event has already ended or changing the stop time of the recording if the extracted duration indicates that the event stop time is still in the future.

According to yet another example, the recording of the event may be stopped in response to an expiration of the extended recording duration of the event.

The recording of the event may be retrospectively trimmed based on the start bookmark and the stop bookmark stored in the metadata for the event according to an example. Accordingly, an end-user will receive an accurate recording of the complete event. The event of the disclosed examples may be a future event (e.g., an event whose start time is in the future) or a currently airing event (e.g., an event whose start time is in the past and stop time is in the future). In examples where the event is a currently airing event, the stop time and duration of the recordings may be updated and adjusted according to the methods disclosed herein.

Technical problems associated with traditional DVR and nDVR systems may be solved by the examples described herein. For example, DVRs and nDVRs may schedule recordings of broadcast television events based on inaccurate EPG data that is received from a third-party EPG provider. The EPG data, for instance, may be outdated due to the third-party EPG provider obtaining the scheduling data days or weeks in advance to the airing of the television event. As a result, an end-user may have to manually extend the start time and the stop time of a recording to ensure that the entire event is captured. The end-user, however, may have to make an educated guess as to how much the recording should be manually extended. In this regard, additional storage space must be reserved in the storage medium and the end-user would inconveniently receive an extended recording that captures extraneous portions of adjacent events, which would require additional navigation by the end-user.

According to the disclosed examples, a Broadcast Schedule Synchronized Recorder (BSSR) of the video recording server may monitor a digitally encoded transport stream received from a channel broadcaster to detect accurate event schedule information regarding a transition to a start of a new event from an end of an old event. Accordingly, the detected new event may be mapped to an event that was scheduled to be recorded based on EPG data. As a result, the scheduled start and stop recording times for the event may be accurately updated in real-time by extracting a set of parameters from the accurate event schedule information of the detected new event as described further below. Thus, the disclosed examples provide the technical effects and benefits of an accurate start and stop of a recording of an event based on accurate event scheduling information from a channel broadcaster.

With reference to FIG. 1, there is shown a system diagram of a digital video recording system 100, according to an example of the present disclosure. It should be understood that the digital video recording system 100 may include additional components and that one or more of the components described herein may be removed and/or modified without departing from a scope of the digital video recording system 100.

The digital video recording system 100 may include a Video Service Delivery Platform (VSDP) 105, a DVR (e.g., nDVR) 110, a data store 115, an end-user devices 120, an encoder 125, a content delivery network 130, and a Broadcast Schedule Synchronized Recorder (BSSR) 135.

The VSDP 105 may provide the television services to end-user devices 120 via interface 102. The television services provided to the end-user devices 120 may for example include digital video recording services. In this regard, the VSDP 105 may control the DVR 110 over interface 104 to record and delete digital video content such as television programs or events.

The DVR 110 may implement a recording function in response to control signals received over interface 104 from the VSDP 105 and over interface 106 from the BSSR 135. The DVR 110 may also perform functions including creating, updating, and deleting digital video recordings of television programs or events. The DVR 110 may store digital video recordings in the data store 115 as further discussed below. According to an example, a digitally encoded audio/video (NV) transport stream that is received from a channel broadcaster may be converted to multiple different formats consumable by different target end-user devices 120 prior to storage in the data store 115. As such, the digitally encoded A/V transport stream may be stored in the correct formats in the data store 115 for later playback by the different target end-user devices 120.

The end-user devices 120 may include a set top box or other media device (e.g., a television, a smartphone, a tablet, a laptop, a wearable computing device, etc.) that is capable of displaying the digitally encoded NV transport stream and the stored digital video recordings received over the content delivery network 130. The encoder 125 generates the digitally encoded NV transport stream as an MPEG-2 transport stream for example. The encoder 125, for instance, is an encoder that is located at a server of the channel broadcaster. The digitally encoded NV transport stream may include accurate event schedule information (e.g., Event Information Table (EIT)) that is injected in-band by the channel broadcaster. The content delivery network 130 may be a distributed system of servers deployed in multiple data centers across the Internet to serve content (e.g., A/V media content) to the end-user devices 120.

The BSSR 130 may monitor the digitally encoded A/V transport stream of each channel to detect accurate event schedule information as discussed further below. In this regard, the BSSR 130 may provide accurate control of the recording of the television programs or events via interface 106. That is, based on the detected accurate event schedule information, the BSSR 130 may provide the DVR 110 with a more accurate recording of an event than if the DVR 110 were to rely solely on EPG data 140.

The EPG data 140 may be an inaccurate source of television schedule information, which is typically delivered by an EPG provider or channel broadcaster to the VSDP 105. The EPG data 140 may include all of the channels that are available on the television service delivered by the VSDP 105 and generated as output by the encoder 125. The EPG data 140 may also be delivered to the end-user devices 120 via the VSDP 105. According to an example, the end-user devices 120 may use this EPG data 140 to present the EPG data 140 in a graphical user interface (GUI) that shows the channels available and their event schedule. The EPG data is optionally also delivered to the BSSR module in case the event IDs used in the EPG data are not the same as those used in the accurate event information coming in-band of the digital encoded linear TV MPEG-2 transport stream.

FIG. 1 also shows several configuration files that may be used by the components of the digital video recording system 100. The channel configuration file 145, for instance, may include information about which of a set of television channels are available on the television service that is offered through the VSDP 105 and are enabled for the DVR 110. The channel configuration file 145 may also provide appropriate tuning information for the set of television channels (e.g., IP multicast addresses). For these channels, the channel configuration file 145 may for example provide a mapping between a channel identifier (ID) that is used in the accurate event schedule information, which is embedded in the digitally encoded transport stream and the channel ID in the EPG data 140. The controlled channels log 150 may be created by the BSSR 135 based on a monitoring of the digitally encoded A/V transport stream of each channel in the channel configuration file 145. The BSSR 135 may determine which channels contain accurate event schedule information and add these channels to the controlled channels log 150. According to an example, the controlled channels log 150 may also be generated out-of-band without monitoring the digitally encoded NV transport stream generated by the encoder 125. The recording metadata 155 is created for each television program or event that is recorded by the DVR 110. The recording metadata 155 may include information such as a recording access location, reference to the EPG event to which the recording is associated and actual event start and stop bookmarks within the digital video recordings for playback by the end-user devices 120.

Figure 2:
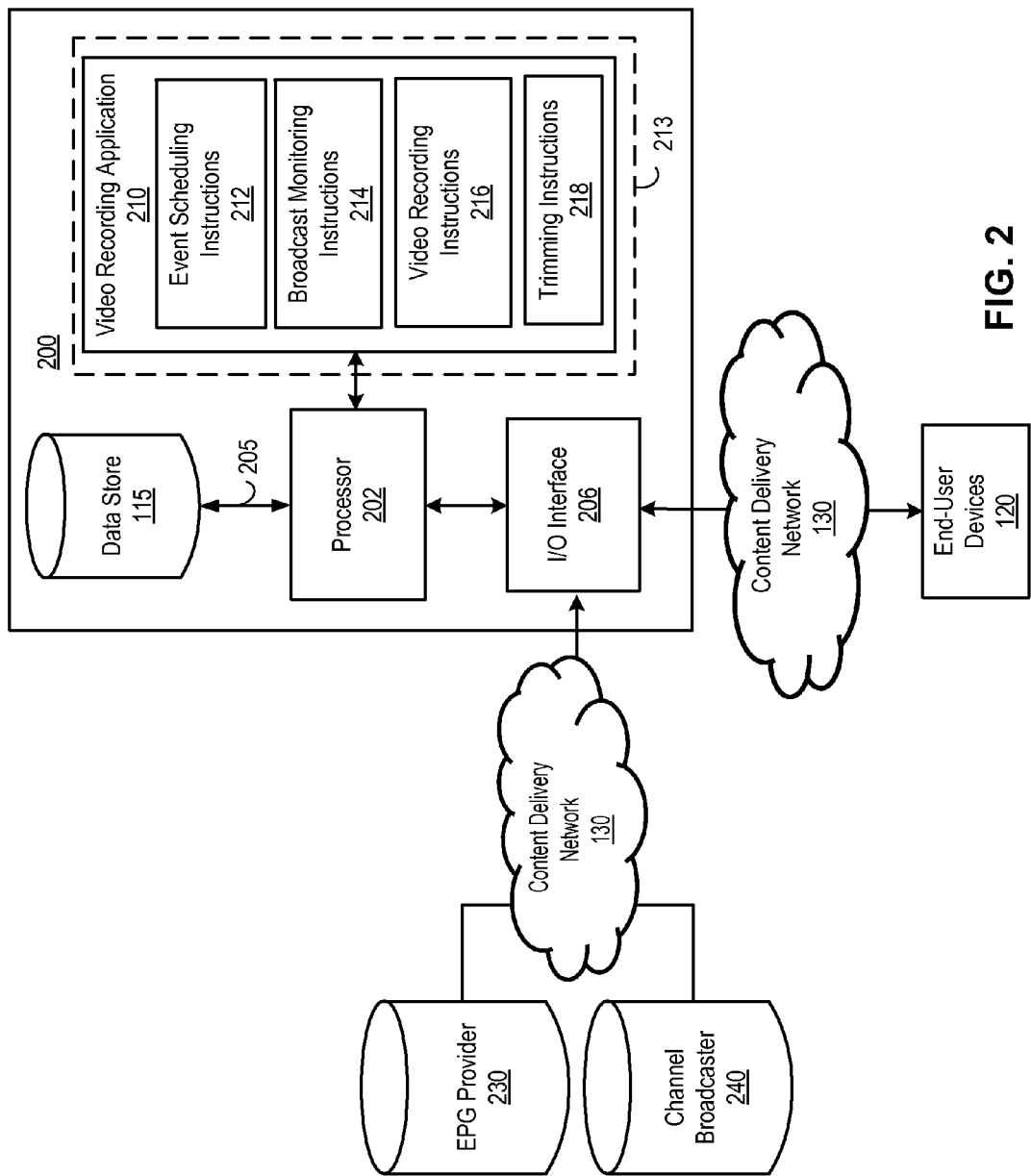
FIG. 2 shows a block diagram of a video recording server, according to an example of the present disclosure.

FIG. 2 shows a block diagram of a video recording server 200, according to an example of the present disclosure. The video recording server 200, for instance, may include and perform the functions of the DVR 110, the data store 115, and the BSSR 135. It should be understood that the video recording server 200 may include additional components and that one or more of the components described herein may be removed and/or modified without departing from a scope of the video recording server 200.

The video recording server 200 is depicted as including a processor 202, a data store 115, an input/output (I/O) interface 206, and a video recording application 210. The video recording server 200, for example, may be a desktop computer, a laptop computer, a smartphone, a computing tablet, a set top box, or any other type of computing device. The video recording server 200 may be a remote server in a network cloud that runs a video service delivery that is utilized by the end-user devices 120. Although the video recording server 200 is shown as a single server in FIG. 1, the video recording server 200 may be implemented by more than one server according to an example. The video recording server 200 may store or manage digital A/V data in a separate computing device, for instance, through a network device, which may include, for instance, a router, a switch, a hub, and the like. The data store 115 may include physical memory such as a hard drive, an optical drive, a flash drive, an array of drives, or any combinations thereof, and may include volatile and/or non-volatile data storage.

The processor 202, which may be a microprocessor, a micro-controller, an application specific integrated circuit (ASIC), or the like, is to perform various processing functions in the video recording server 200. In an example, the video recording application 210 includes machine readable instructions stored on a non-transitory computer readable medium 213 and is executable by the processor 202. Examples of the non-transitory computer readable medium 213 may include dynamic random access memory (DRAM), electrically erasable programmable read-only memory (EEPROM), magnetoresistive random access memory (MRAM), memristor, flash memory, hard drive, and the like. The computer readable medium 213 may be included in the data store 115 or a separate storage device. In another example, the video recording application 210 includes a hardware device, such as a circuit or multiple circuits arranged on a board. In this example, the video recording application 210 may be circuit components or individual circuits, such as an embedded system, an ASIC, or a field-programmable gate array (FPGA).

The processing functions of the video recording application 210 may include event scheduling instructions 212, broadcast monitoring instructions 214, video recording instructions 216, and trimming instructions 218. Event scheduling instructions 212, for instance, may receive record requests from an end-user for an event on a television channel and set a recording start time and stop time for the event. The broadcast monitoring instructions 214, for instance, may monitor a broadcasted digitally encoded transport stream channel for a television channel to detect a new event and its associated accurate event schedule information on a digitally encoded transport stream of the controlled channel, map the new event to the event, and update a recording of the event based on the detected accurate event schedule information. The video recording instructions 216, for instance, may record an event according to the event scheduling instructions 212 and store the recording of the event in the data store 115. The trimming instructions 218, for instance, may trim the recordings based on start and stop bookmarks or the expiration of an extended recording duration.

The processor 202 may be coupled to the data store 115 and the I/O interface 206 by a bus 205, where the bus 205 may be a communication system that transfers data between various components of the video recording server 200. In examples, the bus 205 may be a Peripheral Component Interconnect (PCI), Industry Standard Architecture (ISA), PCI-Express, HyperTransport®, NuBus, a proprietary bus, and the like. The I/O interface 206 may include a hardware and/or a software interface. The I/O interface 206 may be a network interface connected to a content delivery network 130 through a network device, over which the video recording application 210 may receive and communicate information. For example, the I/O interface 106 may be a wireless local area network (WLAN) or a network interface controller (NIC). The WLAN may link the video recording server 200 to a network device through a radio signal. Similarly, the NIC may link the video recording server 200 to a network device through a physical connection, such as a cable. The video recording server 200 may also link to a network device through a wireless wide area network (WWAN), which uses a mobile data signal to communicate with mobile phone towers. The processor 202 may store information received through the I/O interface 206 in the data store 115 and may use the information in implementing the video recording application 110.

Figure 3:
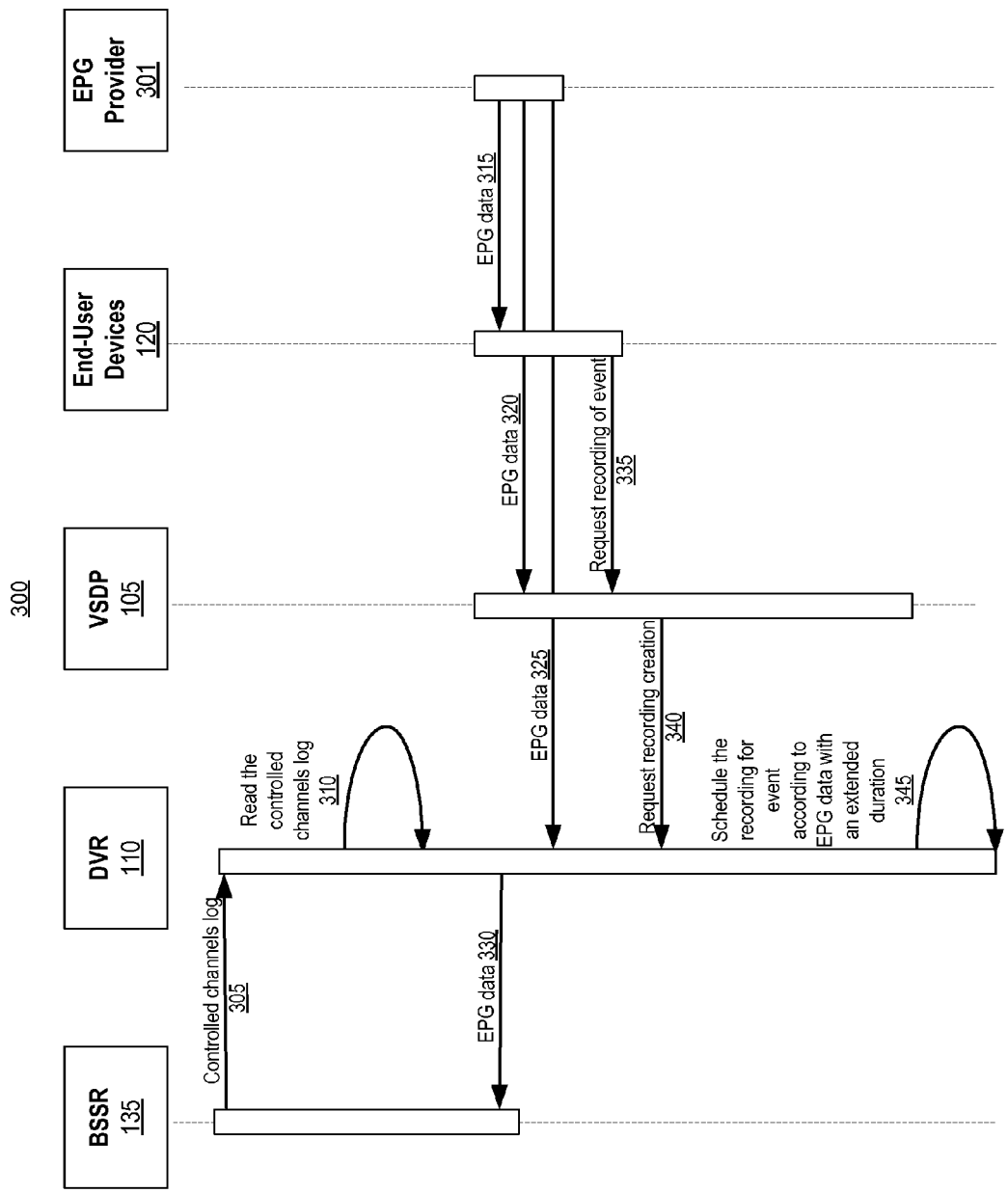
FIG. 3 shows a bounce diagram of a method for initially scheduling a recording of an event based on electronic program guide (EPG) data, according to an example of the present disclosure.
Figure 4:
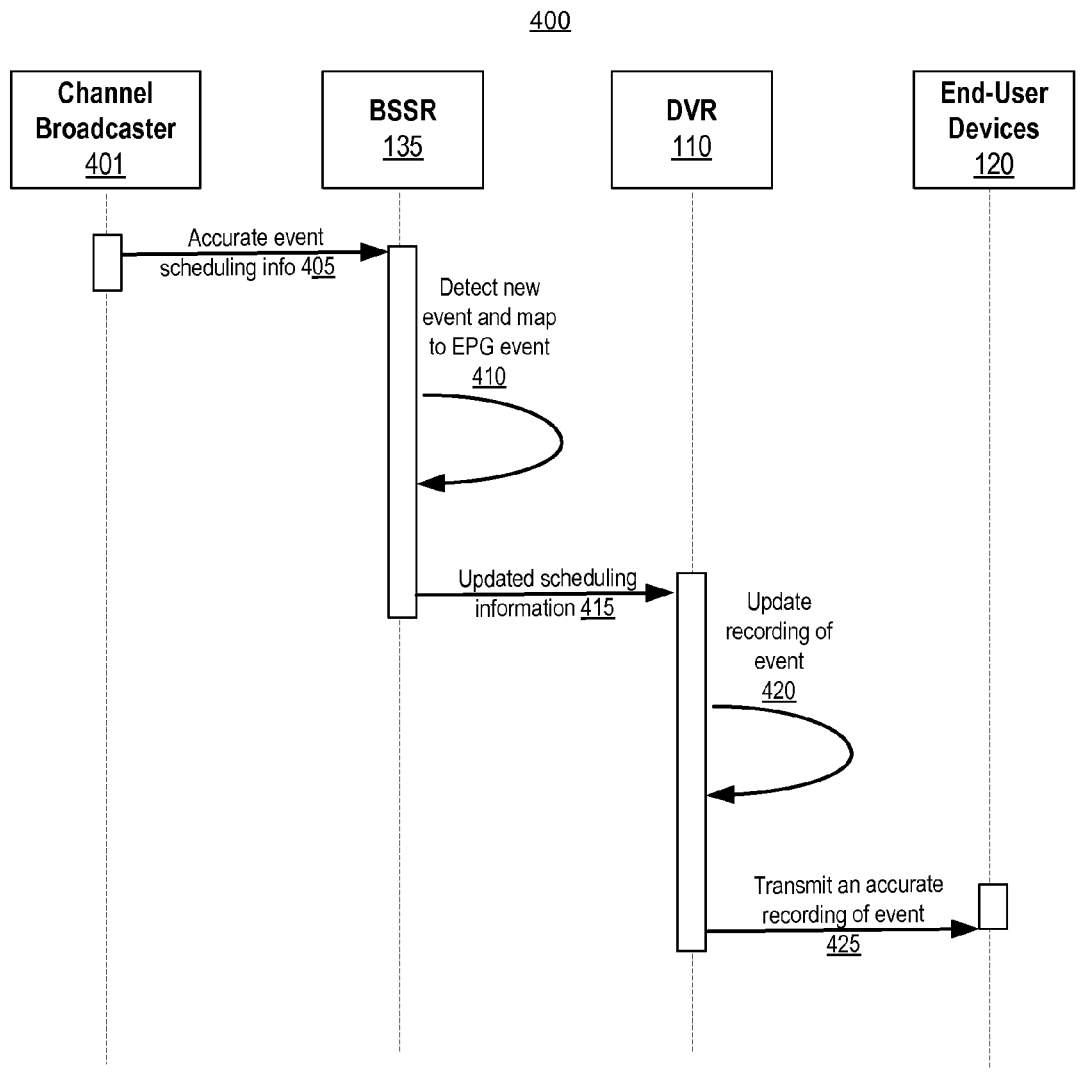
FIG. 4 shows a bounce diagram of a method for updating a recording schedule of an event based on accurate event scheduling information, according to an example of the present disclosure.
Figure 6:
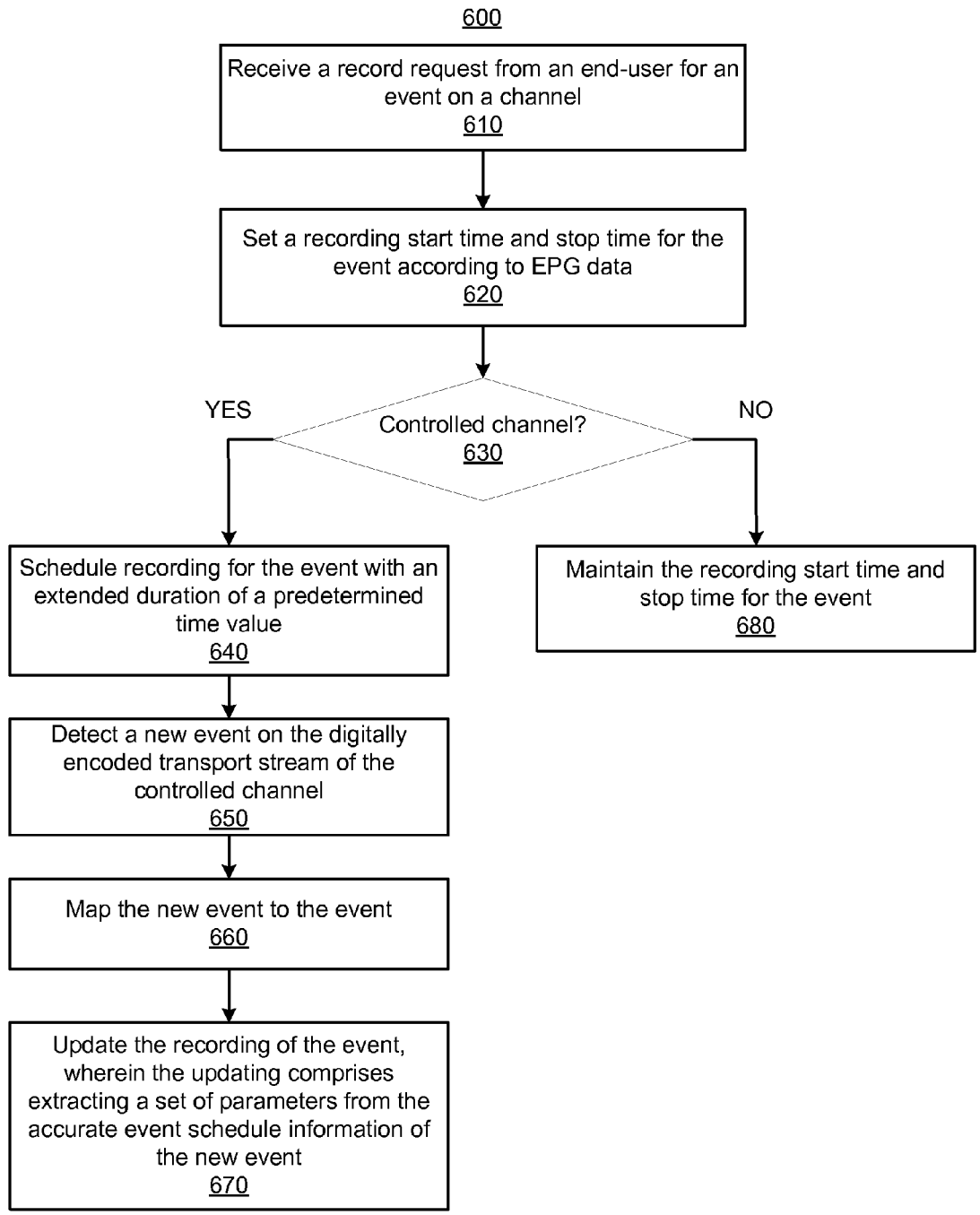
FIG. 6 shows a flow chart of a method to facilitate accurate start and stop recording of an event, according to an example of the present disclosure.

FIGS. 3 and 4 respectively depict bounce diagrams 300 and 400, and FIG. 6 depicts a flow diagram of method 600 to facilitate accurate start and stop recording of an event according to examples of the present disclosure. It should be apparent to those of ordinary skill in the art that the steps depicted in the bounce diagrams 300 and 400 and the method 600 represent generalized illustrations and that other operations may be added or existing operations may be removed, modified or rearranged without departing from the scopes of the steps depicted herein.

With reference to FIG. 3, there is shown a bounce diagram of a method 300 for initially scheduling a recording of an event based on EPG data, according to an example of the present disclosure.

As shown in arc 305, the BSSR 135 may transmit the controlled channels log 150 to the DVR 110. According to an example, when the BSSR 135 is initiated it may read the channels configuration file 145. The BSSR 135 may then begin to monitor each channel from the channels configuration file 145 and extract accurate event schedule information for each of the channels. The BSSR 135 then determines which of the channels have reliably available accurate schedule information for all events and writes these channels to the controlled channels log 150. In this regard, the DVR 110 may read the transmitted controlled channels log 150 in preparation to an initial scheduling of a recording of an event, as shown in arc 310.

As shown in arcs 315, 320, 325, and 330, an EPG provider 301 may transmit EPG data to the end-user devices 120, the VSDP 105, the DVR 110, and the BSSR 135 of the video recording server 200. In this regard, an end-user may submit a request of a recording of an event on a channel to the VSDP 105, as shown in arc 335. The request, for example, may be transmitted using the GUI of an end-user device, which is based on the received EPG data.

As shown in arc 340, the VSDP 105 makes a recording creation request to the DVR 110 after checking for appropriate rights and user policies. As shown in arc 345, if the DVR 110 determines that the recording request is for a controlled channel in the controlled channels log 150, the DVR 110 will schedule the recording for the event according to the EPG data but with an extended duration of a predetermined time value. According to an example, this EPG data is the same EPG data that is used by the VSDP 105, the end-user devices 120, and the BSSR 135. The pre-determined time value is a configurable parameter of the DVR 110 for extended recording of the controlled channels (e.g., minutes, hours, etc.).

With reference to FIG. 4, there is shown a bounce diagram of a method 400 for updating a recording schedule of an event based on accurate event scheduling information, according to an example of the present disclosure.

Prior to the start time of the event as determined by the EPG data, accurate event schedule information may be injected by a channel broadcaster 401 into a digitally encoded transport stream (e.g., MPEG-2) of a controlled channel, as shown in arc 405. The accurate event scheduling information for example is metadata about a television channel. For example, an Event Information Table (EIT) 500 may be transmitted with MPEG-2 transport streams according to provide information regarding currently playing events and upcoming events on a television channel in the form of present/following (p/f) information, in addition to a short descriptor for each event. An example of an EIT is shown in FIG. 5.

As shown in arc 410, the BSSR 135 may detect a new event with accurate event schedule information from the digitally encoded transport stream of a controlled channel. The new event, for example, may be a change in the EIT that indicates a transition between p/f events. The transition between p/f events, for example, signals a start of a new event and an end of an old event. The BSSR 135 may then retrieve an event ID of this new event, and because it is not the same as the event ID of the event in the EPG data, the BSSR 135 maps the new event ID to the EPG event ID based on a heuristic. For example, the heuristic may find an event in the EPG data that has a start time that matches the new event for the channel, while allowing for predetermined tolerance (e.g., 10 minutes), and has a title in the EPG data which contains the title provided in the EIT short event descriptor. It is noted that the disclosed heuristic is not limited to the combination of parameters of the previous example. Accordingly, the disclosed heuristic may include any other parameter or combination of parameters (e.g., the start time, stop time, duration, title, etc.) that are available in the accurate event information. The BSSR 135 may link the new event to the event if they are determined to match using the heuristic.

As shown in arc 415, the BSSR 135 may transmit a recording update message for the event to the DVR 110 with a set of parameters including a start time and duration as derived from the accurate event schedule information of the matched new event. The DVR 110 may then update the pending or in progress recording of the event based on the recording update message received from the BSSR 135, as shown in arc 420. Additionally, the DVR 110, for instance, may create a recording metadata file 155 that documents a start bookmark, and stop bookmark, an updated duration, etc. based on the recording update message. Examples of methods for updating the recording of the event based on the recording update message are discussed in greater detail with respect to method 600 in FIG. 6 below.

As shown in arc 425, the DVR 110 may transmit an accurate recording of the event to the end-user devices 120 for playback. According to an example, the end-user devices 120 may use the recording metadata file 155 to determine the playback location and thus start playback from the beginning of the recorded event.

FIG. 6 shows a flow chart of a method 600 to facilitate accurate start and stop recording of an event, according to an example of the present disclosure. The method 600 is implemented, for example, by the processor 202 of the video recording server 200 as depicted in FIG. 2.

In block 610, the VSDP 105, for instance, may receiving a record request from an end-user for an event on a channel. The channel of the event may be included in a channel configuration file. For example, channel configuration file includes tuning information for all available channels provided by a VSDP 105. As a result, the VSDP 105 may control the DVR 110 to set a recording start time and stop time for the event according to EPG data that is received from a third-party EPG provider as shown in block 620.

In block 630, the DVR 110, for instance, may then determine whether the channel of the event is a controlled channel that is included in a controlled channels log. The controlled channels log, for instance, includes a set of channels where accurate event scheduling information from a digitally encoded transport stream is readily available as determined by the BSSR 135. The accurate event schedule information may be information that is included in an event information table (EIT) that is transmitted as service information (SI) embedded in the digitally encoded transport stream, wherein the EIT includes a start time, a stop time, a duration, and a short descriptor for an event as shown in FIG. 5.

The DVR 110 may determine whether the channel of the event is a controlled channel by monitoring the digitally encoded transport stream to determine which channels include accurate event schedule information. Thus, in response to determining that a channel includes accurate event schedule information, the DVR 110 may extract the accurate event schedule information for the channel and add the channel to the controlled channels log 150.

In response to determining that the channel is not a controlled channel, the DVR 110 may maintain the schedule recording time for the event according to the EPG data, as shown in block 680. On the other hand, in response to determining that the channel is a controlled channel, the DVR 110 may schedule the recording according to the EPG data but with an extended recording duration of a predetermined value for the event, as shown in block 640.

The BSSR 135, for instance, may detect a new event on the digitally encoded transport stream of the controlled channel, as shown in block 650. In block 660, the BSSR 135 may map the new event to the EPG event because the event ID of the new event is not the same as the event ID of the event in the EPG data. In order to map the new event to the event, the BSSR 135 may first determine, from the accurate event schedule information of the new event, whether the new event has a start time within a predetermined tolerance to the recording start time of the EPG data for the event. The BSSR 135 may then determine, from the accurate event schedule information of the new event, whether the new event has a same title as a title of the event in the EPG data. If the BSSR 135 determines that the new event has a start time within a predetermined tolerance to the recording start time for the event and that the new event has a same title as the title of the event, then the BSSR 135 may link the new event to the event.

In block 670, the BSSR may update the recording of the event. The updating of the recording of the event may include extracting a set of parameters from the accurate event schedule information of the new event.

According to one example, the updating of the recording of the event may include extracting a start time from the set of parameters of the accurate event schedule information of the new event. If the BSSR 135 determines that the start time of the new event is different from the recording start time for the event according to the EPG data, the BSSR 135 may update the recording of the event by at least one of starting the recording of the event, setting a start bookmark in the recording metadata file 155 for the recording of the event, or updating the recording start time of the event as discussed above.

According to another example, the updating of the recording of the event may include extracting a stop time from the set of parameters of the accurate event schedule information of the new event. The BSSR 135 may then stop the recording of the event, extend the recording of the event, or set a stop bookmark in the recording metadata file 155 for the recording of the event based on the extracted stop time parameter as discussed above.

According to another example, the updating of the recording of the event may include extracting a duration from the set of parameters of the accurate event schedule information of the new event. In this regard, the recording duration for the event may be modified based on the extracted duration. For instance, the BSSR 135 may stop the recording of the event if the extracted duration indicates that the event has already ended or change the stop time of the recording if the extracted duration indicates that the event stop time is still in the future.

According to yet another example, the DVR 110, for instance, may stop the recording of the event in response to an expiration of the extended recording duration of the event. In this example, the DVR 110 does not receive a recording update message from the BSSR 135. Accordingly, the DVR 110 may trim the data that was recorded within the predetermined time value from the recording of the event.

Thus, the scheduled start and stop recording times for the event may be accurately updated in real-time by extracting a set of parameters from the accurate event schedule information of the detected new event as described in shown in FIG. 6. Therefore, the disclosed examples provide the technical effects and benefits of an accurate start and stop of a recording of an event based on accurate event scheduling information from a channel broadcaster.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method to facilitate a recording of an event, the method comprising:
   receiving, by a controller of a video recording server, a record request from an end-user for the event on a channel;
   setting a recording start time and stop time for the event according to electronic programming guide (EPG) data;
   determining whether the channel is included in a controlled channels log, wherein the controlled channels log comprises event scheduling information from a digitally encoded transport stream; and
   in response to determining that the channel is in the controlled channels log, scheduling the recording for the event according to the EPG data with an extended duration of a predetermined time value, detecting a new event on the digitally encoded transport stream of the channel in the controlled channel log, mapping the new event to the event, wherein mapping the new event to the event includes:

determining, from the event schedule information of the new event, whether the new event has a start time within a predetermined tolerance to the recording start time for the event according to the EPG data;

determining whether the new event has a same title as a title of the event according to the EPG data; and linking the new event to the event in response to determining that the new event has the same title as the title of the event according to the EPG data, and updating the recording of the event, wherein the updating comprises extracting a set of parameters from the event schedule information of the new event.

2. The method of claim 1, comprising reading a channel configuration file, wherein the channel configuration file includes tuning information for available channels provided by a video service delivery platform.

3. The method of claim 2, further comprising:

monitoring the digitally encoded transport stream for a channel that includes event schedule information;

extracting the event schedule information for the channel that includes event schedule information; and adding the channel to the controlled channels log.

4. The method of claim 1, wherein the event schedule information is information included in an event information table (EIT) that is transmitted as service information (SI) embedded in the digitally encoded transport stream, wherein the EIT includes a start time, a stop time, a duration, and a short event descriptor for an event.

5. The method of claim 1, wherein the updating of the recording of the event comprises:

extracting a start time from the set of parameters of the event schedule information of the new event;

determining that the start time of the new event is different from the recording start time for the event according to the EPG data;

in response to the extracted start time being prior to the start time set according to the EPG data, starting the recording of the event; and in response to the extracted start time being subsequent to the start time set according to the EPG data, setting a start bookmark in recording metadata for the event if the recording of the event is in progress, and updating the start time of the recording of the event to a different value if the recording of the event is not in progress.

6. The method of claim 5, wherein setting the start bookmark comprises trimming the recording of the event based on the start bookmark.

7. The method of claim 1, wherein the updating of the recording of the event comprises:

extracting a stop time from the set of parameters of the event schedule information of the new event;

in response to the extracted stop time being prior to the stop time set according to the EPG data, stopping the recording of the event if the recording of the event in progress and the extracted stop time indicates that the event has already ended;

in response to the extracted stop time being subsequent to the stop time set according to the EPG data, updating the stop time of the recording of the event if the recording of the event is in progress or is not yet started, and setting a stop bookmark in recording metadata for the event if the recording of the event was completed prior to extracting the stop time.

8. The method of claim 1, comprising:

stopping the recording of the event in response to an expiration of the extended recording duration of the event; and trimming data that was recorded within the predetermined time value from the recording of the event.

9. The method of claim 1, wherein the updating of the recording of the event comprises:

extracting a duration from the set of parameters of the event schedule information of the new event; and modifying the recording duration for the event based on the extracted duration, wherein the modifying includes at least one of:

stopping the recording of the event if the extracted duration indicates that the event has already ended; and changing the stop time of the recording of the event if the extracted duration indicates that the event stop time is still in the future.

10. A system for facilitating an recording of an event, the system comprising:

a video service delivery platform to:

receive a record request from an end-user for the event on a channel, and control a recording start time and stop time for the event at a digital video recorder according to electronic programming guide (EPG) data;

the digital video recorder to:

determine whether the channel is a controlled channel that is included in a controlled channels log, and in response to determining that the channel is the controlled channel, schedule the recording for the event according to the EPG data with an extended duration of a predetermined time value; and a broadcast schedule synchronized recorder to:

generate the controlled channels log, wherein the controlled channels log includes a set of channels that each include event scheduling information from a digitally encoded transport stream;

detect a new event on the digitally encoded transport stream of the controlled channel, map the new event to the event, wherein to map the new event to the event, the broadcast schedule synchronized recorder is to:

determine, from the event schedule information of the new event, whether the new event has a start time within a predetermined tolerance to the recording start time for the event according to the EPG data;

determine whether the new event has a same title as a title of the event according to the EPG data; and link the new event to the event in response to the determination that the new event has a same title as a title of the event according to the EPG data, and update the recording of the event, wherein the updating includes extracting a set of parameters from the event schedule information of the new event.

11. The system of claim 10, wherein the broadcast schedule synchronized recorder is further to:

monitor the digitally encoded transport stream for a channel that includes event schedule information;

extract the event schedule information for the channel that includes event schedule information; and add the channel to the controlled channels log.

12. A non-transitory computer readable medium on which is stored machine readable instructions to facilitate an recording of an event, the machine readable instructions executable by a controller to:

set a recording start time and stop time for the event according to electronic programming guide (EPG) data;

schedule a recording for the event according to EPG data with an extended duration of a predetermined time value;

detect a new event on the digitally encoded transport stream of the controlled channel, wherein the new event includes event schedule information;

map the new event to the event, wherein to map the new event to the event, the broadcast schedule synchronized recorder is to:

determine, from the event schedule information of the new event, whether the new event has a start time within a predetermined tolerance to the recording start time for the event according to the EPG data;

determine whether the new event has a same title as a title of the event according to the EPG data; and link the new event to the event in response to the determination that the new event has a same title as a title of the event according to the EPG data; and update the recording of the event, wherein the updating comprises extracting a set of parameters from the event schedule information of the new event.

13. The non-transitory computer readable medium of claim 12, wherein to update the recording of the event, the machine readable instructions are further executable by the processor to:

extract a start time from the set of parameters of the event schedule information of the new event;

determine that the start time of the new event is different from the recording start time for the event according to the EPG data;

in response to the extracted start time being prior to the start time set according to the EPG data, start the recording of the event; and in response to the extracted start time being subsequent to the start time set according to the EPG data, set a start bookmark in recording metadata for the event if the recording of the event is in progress, and update the start time of the recording of the event to a different value if the recording of the event is not in progress.

14. The non-transitory computer readable medium of claim 13, wherein to set the start bookmark, the machine readable instructions are further executable by the processor to trim the recording of the event based on the start bookmark.

15. The non-transitory computer readable medium of claim 12, wherein to update the recording of the event, the machine readable instructions are further executable by the processor to:

extract stop time from the set of parameters of the event schedule information of the new event;

in response to the extracted stop time being prior to the stop time set according to the EPG data, stopping the recording of the event if the recording of the event is in progress and the extracted stop time indicates that the event has already ended; and in response to the extracted stop time being subsequent to the stop time set according to the EPG data, updating the stop time of the recording of the event if the recording of the event is in progress or is not yet started, and setting a stop bookmark in recording metadata for the event if the recording of the event was completed prior to extracting the stop time.

16. The non-transitory computer readable medium of claim 12, wherein the machine readable instructions are further executable by the processor to:

stop the recording of the event in response to an expiration of the extended recording duration of the event; and trim data that was recorded within the predetermined time value from the recording of the event.

17. The non-transitory computer readable medium of claim 12, wherein to update the recording of the event, the machine readable instructions are further executable by the processor to:

extract a duration from the set of parameters of the event schedule information of the new event; and modify the recording duration for the event based on the duration, wherein to modify the recording duration the machine readable instructions are to further executable by the processor to at least one of:

stop the recording of the event if the extracted duration indicates that the event has already ended; and change the stop time of the recording of the event if the extracted duration indicates that the event stop time is still in the future.

* * * * *